(12) United States Patent
Olszewski et al.

(10) Patent No.: US 11,960,132 B2
(45) Date of Patent: Apr. 16, 2024

(54) MULTILAYER LOW ATTENUATION DROP CABLE

(71) Applicant: CORNING RESEARCH & DEVELOPMENT CORPORATION, Corning, NY (US)

(72) Inventors: Sebastian Olszewski, Aleksandrów (PL); Marta Krystyna Tomczak, Łódź (PL)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 0 days.

(21) Appl. No.: 17/947,437

(22) Filed: Sep. 19, 2022

(65) Prior Publication Data

US 2023/0011374 A1 Jan. 12, 2023

Related U.S. Application Data

(63) Continuation of application No. 17/227,549, filed on Apr. 12, 2021, now Pat. No. 11,474,318, which is a continuation of application No. PCT/US2019/056034, filed on Oct. 14, 2019.

(60) Provisional application No. 62/746,156, filed on Oct. 16, 2018.

(51) Int. Cl.
 *G02B 6/44* (2006.01)
(52) U.S. Cl.
 CPC .................. *G02B 6/4432* (2013.01)
(58) Field of Classification Search
 CPC .................................... G02B 6/4432
 See application file for complete search history.

(56) References Cited

U.S. PATENT DOCUMENTS

| 4,976,519 A | 12/1990 | Davey et al. |
| 5,852,698 A | 12/1998 | Bringuier |
| 7,082,241 B2 * | 7/2006 | Risch .................... G02B 6/443 |
| | | 385/100 |

(Continued)

FOREIGN PATENT DOCUMENTS

| EP | 0296836 A1 * | 12/1988 | ............. G02B 6/443 |
| GB | 2159296 A | 11/1985 | |
| WO | 2018/013396 A1 | 1/2018 | |

OTHER PUBLICATIONS

Dinsmore, Nylon 12 PA, https://www.dinsmoreinc.com/material/nylon-12-pa-2/ (Year: 2022).

(Continued)

*Primary Examiner* — Charlie Y Peng
(74) *Attorney, Agent, or Firm* — William D. Doyle

(57) ABSTRACT

A communication cable is provided that retains low signal attenuation even after multiple cycles through significant temperature changes. The cable includes a communication element, a tight buffer element that surrounds the communication element, a strengthening element that surrounds the tight buffer element, an inner jacket that surrounds the strengthening element, and an outer jacket that surrounds the inner jacket. The outer jacket protects the interior components and is made of a hard material, and the inner jacket protects the communication element from the mechanical stresses of temperature-induced thermal expansion and contraction of the outer jacket.

15 Claims, 5 Drawing Sheets

(56) References Cited

U.S. PATENT DOCUMENTS

| | | |
|---|---|---|
| 8,103,141 B2 | 1/2012 | Parris et al. |
| 8,878,066 B2 | 11/2014 | Galletti et al. |
| 9,201,204 B2 | 12/2015 | Risch et al. |
| 9,658,418 B2 | 5/2017 | Ceschiat et al. |
| 9,784,935 B2 | 10/2017 | Bringuier et al. |
| 2004/0096166 A1 | 5/2004 | Rossi et al. |
| 2004/0258372 A1* | 12/2004 | Risch ............ G02B 6/443 385/100 |
| 2011/0061171 A1 | 3/2011 | Kim et al. |
| 2011/0150403 A1 | 6/2011 | Kachmar et al. |
| 2014/0119698 A1 | 5/2014 | Homma et al. |
| 2015/0226928 A1 | 8/2015 | Ceschiat et al. |
| 2015/0268430 A1 | 9/2015 | Bringuier et al. |

OTHER PUBLICATIONS

European Patent Application No. 19873428.7, Extended European search report, dated May 18, 2022; 10 pages; European Patent Office.

International Search Report and Written Opinion of the International Searching Authority; PCT/US2019/056034; dated Jan. 10, 2020; 10 pages; European Patent Office.

\* cited by examiner

MULTILAYER LOW ATTENUATION DROP CABLE

CROSS-REFERENCE TO RELATED APPLICATION

This application is a continuation of U.S. patent application Ser. No. 17/227,549 filed Apr. 12, 2021, which is a continuation of International Application No. PCT/US2019/056034 filed on Oct. 14, 2019, which claims the benefit of priority under 35 U.S.C. § 119 of U.S. Provisional Application Ser. No. 62/746,156, filed Oct. 16, 2018, the content of each of which is relied upon and incorporated herein by reference in its entirety.

BACKGROUND

The disclosure relates generally to communication cables and more particularly to communication drop cables that have a structure that provides low signal attenuation even through large variations in temperature. Communication cables have seen increased use in a wide variety of electronics and telecommunications fields. Communication cables contain or surround one or more communication fibers. The cable provides structure and protection for the communication fibers within the cable.

SUMMARY

One embodiment of the disclosure relates to an optical fiber cable including an optical fiber, a tight buffer layer that surrounds the optical fiber, a strengthening element that surrounds the tight buffer layer, an inner jacket that surrounds the strengthening element, and an outer jacket that surrounds the inner jacket. The inner jacket is made of a material having a coefficient of thermal expansion of no more than 20 ppm/° C., and the outer jacket is made of a different material having a Shore D hardness of at least 40.

Another embodiment of the disclosure relates to a fiber optic cable that maintains a low attenuation coefficient change (less than 0.05 dB/km for a wavelength of 1550 nm) after the cable is cycled through a series of temperature changes. The series of temperature changes include one or more of a first temperature of 20 degrees Celsius for six hours, a second temperature of −15 degrees Celsius for six hours, a third temperature of 60 degrees Celsius for six hours, a fourth temperature of −15 degrees Celsius for six hours, a fifth temperature of 60 degrees Celsius for six hours, a sixth temperature of 20 degrees Celsius for six hours, a seventh temperature of −30 degrees Celsius for six hours, an eighth temperature of 70 degrees Celsius for six hours, and a ninth temperature of −30 degrees Celsius for six hours. The cable includes a fiber optic element, a fiber polymer layer, a strengthening element of soft aramid yarns that surrounds the fiber polymer layer, an inner jacket that surrounds the strengthening element, and an outer jacket that surrounds the inner jacket. The fiber polymer layer has an inner surface that is bonded to an outer surface of the fiber optic element. An inner surface of the outer jacket is directly bonded to an outer surface of the inner jacket, and the outer surface of the outer jacket defines the outer-most surface of the cable.

Another embodiment of the disclosure relates to an optical tele-communication cable including a communication element, a tight buffer element that surrounds the communication element, a plurality of aramid yarn strands surrounding the tight buffer element, an inner jacket that surrounds the aramid yarn strands, and an outer jacket that surrounds the inner jacket. The inner jacket is made of a material having a coefficient of thermal expansion of no more than 20 ppm/° C., and the outer jacket is made of a different material having a Shore D hardness of at least 40. The optical tele-communication cable has an attenuation coefficient change less than 0.05 dB/km for a wavelength of 1550 nm while the cable is cycled through a series of temperatures, such as a series of temperatures including a first temperature of 20 degrees Celsius for six hours, a second temperature of −15 degrees Celsius for six hours, a third temperature of 60 degrees Celsius for six hours, a fourth temperature of −15 degrees Celsius for six hours.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Figure 1:
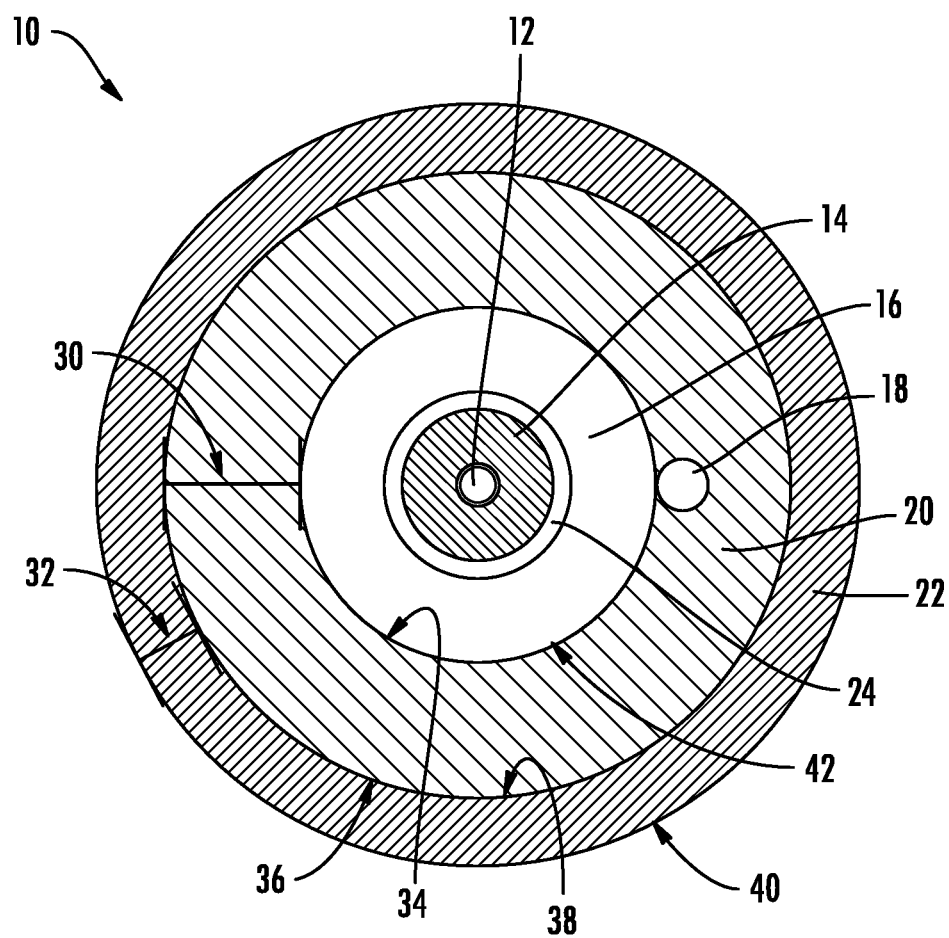
FIG. 1 is a cross-sectional view of an optical fiber cable, according to an exemplary embodiment.

Referring generally to the figures, optical cables are deployed in ways that subject them to highly variable weather and/or temperature conditions. For example, optical cables may experience temperature cycling from −40° C. to 70° C. as well as various forms and amounts of precipitation. Such optical cables are nevertheless expected to have long operational lives (e.g., 5 to 20 years or more) while not experiencing leaks that might otherwise damage the cables, fibers, and other components contained therein.

In general, cold temperatures cause the cable jacket to contract and/or become stiff, and warm temperatures cause the cable jacket to expand. The difference in expansion and contraction between the cable jacket and the internal optical fiber creates stresses along the length of the cable, which can cause the cable to loop or twist. This looping and twisting is known as buckling, and such buckling and the related strain on the fibers can cause signal attenuation and/or premature degradation of the cable. Antibuckling elements, such as rods of plastic reinforced with glass fibers (e.g., GRP rods), may be positioned around the buffer tube of the optical fiber to reduce buckling. However GRP rods are relatively stiff, which impairs bend performance, and must be applied at relatively low processing speeds, e.g., at cable line extrusion speeds of about 20 m/min.

Rather than protecting the optical fiber(s) using a stiff antibuckling element, various embodiments described herein include a bedding, such as an inner jacket, formed from a first material with a low coefficient of thermal expansion (CTE), a low modulus of elasticity and/or a relatively low Shore hardness rating. An outer jacket surrounds the inner jacket, and is formed from a second material, different than the first material, that has a higher Shore hardness rating, a higher CTE, and a higher modulus of elasticity. The inner and outer jackets surround a strengthening element of aramid yarns, such as yarns available under the brand name KEVLAR.

The outer jacket protects the interior of the cable from mechanical damage, and the inner jacket and the aramid yarns protect the cable's optical fibers from temperature-induced length modulations of the outer jacket. As a result, the cable maintains a low signal attenuation coefficient change that is below 0.05 dB/km after cycling through multiple significant temperature changes (e.g., between negative 30 degrees Celsius and positive 60-70 degrees Celsius).

One method of testing the cable comprises subjecting the cable to temperature cycling and measuring signal attenuation. One embodiment of the cable includes a tight buffer element with a fiber optic element, a strengthening element of soft aramid yarns that surrounds the tight buffer element, an inner jacket that surrounds the strengthening element and an outer jacket that surrounds the inner jacket. The cable maintains a signal attenuation less than 0.05 dB/km for a wavelength of 1550 nm while the cable is cycled through a given series of temperatures. The temperature cycles include maintaining the cable's environment at 20 degrees Celsius for six hours, then −15 degrees Celsius for six hours, then 60 degrees Celsius for six hours, then −15 degrees Celsius for six hours, then 60 degrees Celsius for six hours, then 20 degrees Celsius for six hours, and then −30 degrees Celsius for six hours. The signal attenuation is measured periodically through these temperature cycles, and the cable maintains a signal attenuation of less than 0.05 dB/km for a 1550 nm signal.

In various embodiments, the outer jacket has a modulus of elasticity of at least 100 mPa, at least 110 mPa, or at least 115 mPa. In various embodiments the inner jacket has a coefficient of thermal expansion of no more than 20 ppm/° C., no more than 15 ppm/° C., or no more than 10 ppm/° C. In various embodiments the outer jacket is made of a material having a Shore D hardness of at least 45, a material having a Shore D hardness of at least 48, or a material having a Shore D hardness of at least 50.

The strength member elements according to the present embodiments can be, for example, elongate elements extending along the length of a cable. In one embodiment, the strength member elements includes aramid yarns, such as yarns available under the brand name KEVLAR, disposed within or inside the cable jacket.

Referring to FIG. 1, a cable, shown as optical communication cable 10, is shown according to an exemplary embodiment. Cable 10 includes multiple jackets or layers, shown as outer jacket 22 and inner jacket 20, with outer jacket 22 surrounding inner jacket 20. Cable 10 also includes a layer of tensile strength elements/material, shown as aramid yarn strands of aramid yarns 16.

In various embodiments, inner jacket 20 is made of a material that has a low CTE in part to reduce the effect of thermal expansion or contraction on aramid yarns 16 and tight buffer 14, such as a tight buffer layer or tight buffer element. Outer jacket 22 has a high CTE in part as a result of being made of a harder material with a higher Shore hardness rating.

In an embodiment, inner jacket 20 is made of a material having a "low" CTE of less than 20 ppm/° C. In other embodiments, the composition of inner jacket 20 is selected such that the CTE is no more than 15 ppm/° C., or no more than 10 ppm/° C.

In an embodiment, outer jacket 22 is made of a material having a "high" CTE of at least 50 ppm/° C. In other embodiments, the CTE of outer jacket 22 is at least 60 ppm/° C., and in still other embodiments, the CTE of outer jacket 22 is at least 70 ppm/° C.

Figure 2:
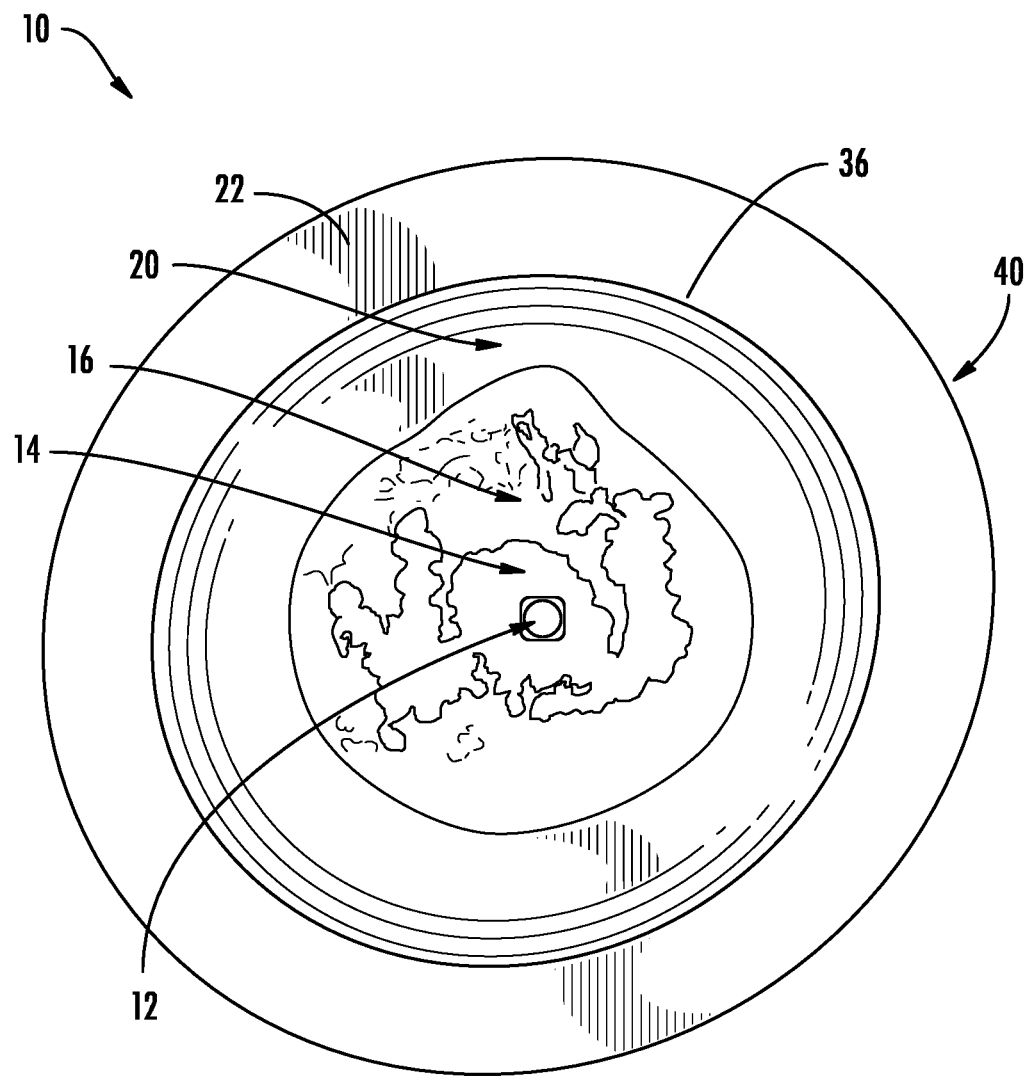
FIG. 2 is a cross-sectional view of an optical fiber cable, according to an exemplary embodiment.

Inner jacket 20 and aramid yarns 16 at least partially protect tight buffer 14 and communication element 12 from thermally-induced length modulations of outer jacket 22. An easy access structure, shown as rip cord 18, may be located inside outer jacket 22 to facilitate access to tight buffer 14. Air gap 24 is between aramid yarns 16 and tight buffer 14. In use, aramid yarns 16 may disperse into air gap 24 and eliminate the empty space (best shown FIG. 2). In various embodiments, tight buffer 14 and communication element 12 are an optical fiber, such as a tightly buffered 900 micron optical fiber. In one embodiment, tight buffer 14 is a fiber polymer layer.

Figure 3:
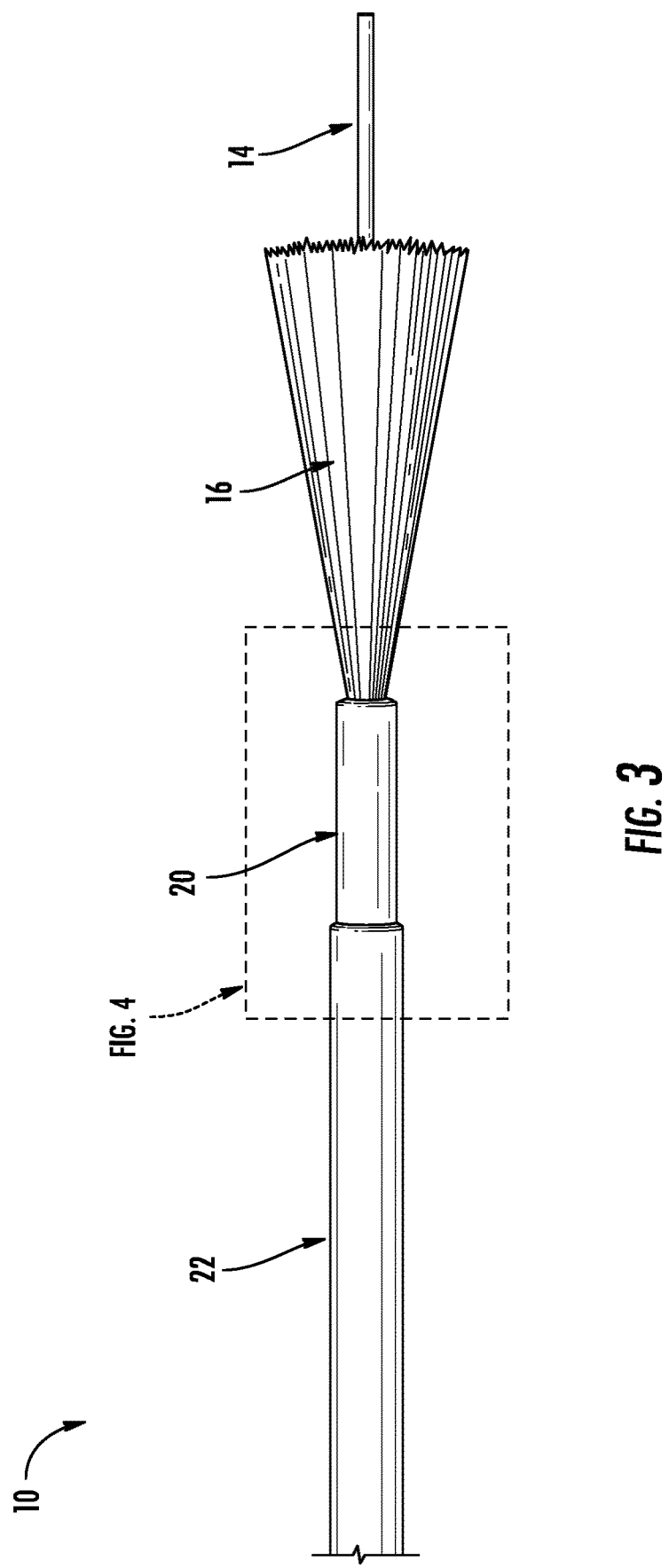
FIG. 3 is a perspective view of an optical fiber cable, according to an exemplary embodiment.
Figure 4:
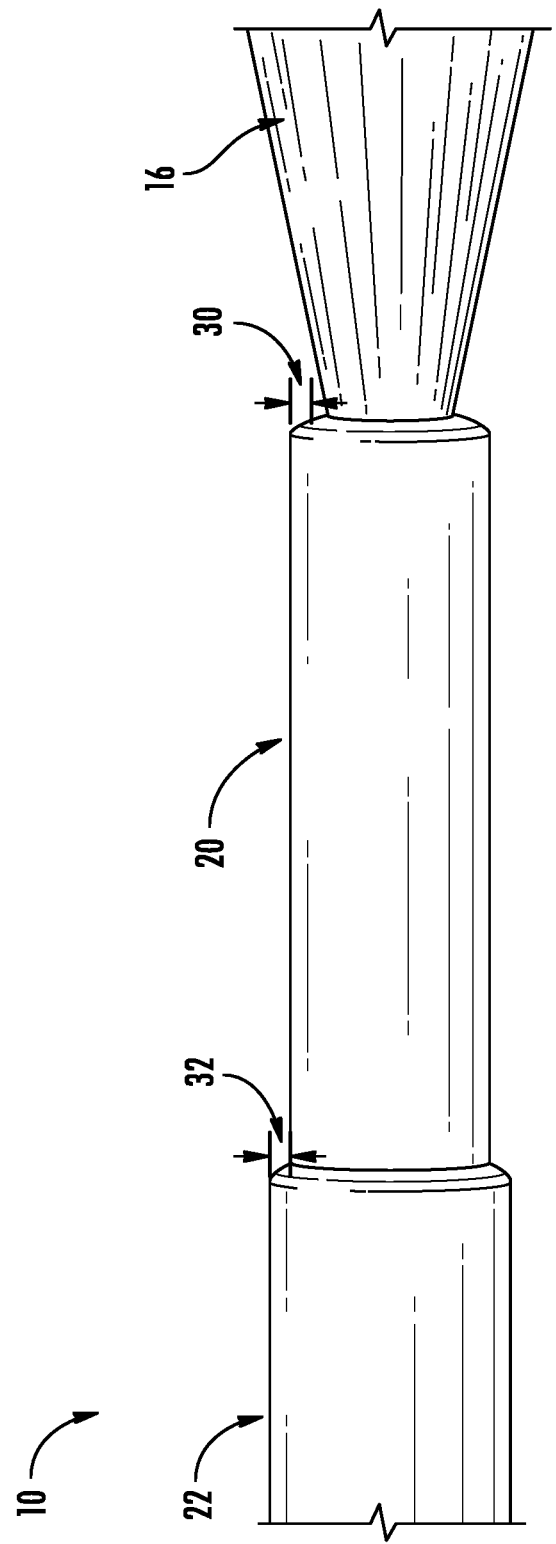
FIG. 4 is a detailed perspective view of the optical fiber cable of FIG. 3, according to an exemplary embodiment.

Turning to FIGS. 3-4, an exemplary cable 10 has various layers stripped for easier identification and reference, according to an embodiment. Outer jacket 22 surrounds inner jacket 20, which surrounds aramid yarns 16, which surrounds tight buffer 14. Outer jacket 22 has thickness 32 that is equal to thickness 30 of inner jacket 20. Aramid yarns 16 are located in a region between outer surface 42 of tight buffer 14 and inner surface 34 of inner jacket 20, inner surface 38 of outer jacket 22 is directly bonded to outer surface 36 of inner jacket 20, and outer surface 40 of outer jacket 22 defines the outer-most surface of cable 10.

In one or more embodiments, various polymer layers surround their interior layers in the circumferential direction and are formed from contiguous, continuous section of material that are continuous for at least 1 meter, 10 meters, or 100 meters along the light of the fiber.

In addition to the material types and material properties discussed herein, the various inner jacket 20 and outer jacket 22 layers discussed herein are sized to provide cable 10 with the desired mechanical strengths and burn performance characteristics. As shown in FIG. 4, outer jacket 22 has average thickness 32 and inner jacket 20 has average thickness 30. In various embodiments thickness 30 of inner jacket 20 and thickness 32 of outer jacket 22 are at or near 0.6 mm, and the ratio between thickness 30 and thickness 32 is 1:1.

In other embodiments, thickness 30 of inner jacket 20 may be as small as 0.58 mm, as small as 0.55 mm, or as small as 0.5 mm. Thickness 30 of inner jacket 20 may be as large as 0.62 mm, as large as 0.65 mm, or as large as 0.7 mm. Thickness 32 of outer jacket 22 may be as small as 0.58 mm, as small as 0.55 mm, or as small as 0.5 mm. Thickness 32 of outer jacket 22 may be as large as 0.62 mm, as large as 0.65 mm, or as large as 0.7 mm. Correspondingly, the ratio between thickness 30 and thickness 32 may be as small as 0.71:1 (which correlates to 0.5:0.7) or as large as 1.4:1 (which correlates to 0.7:0.5).

Figure 5:
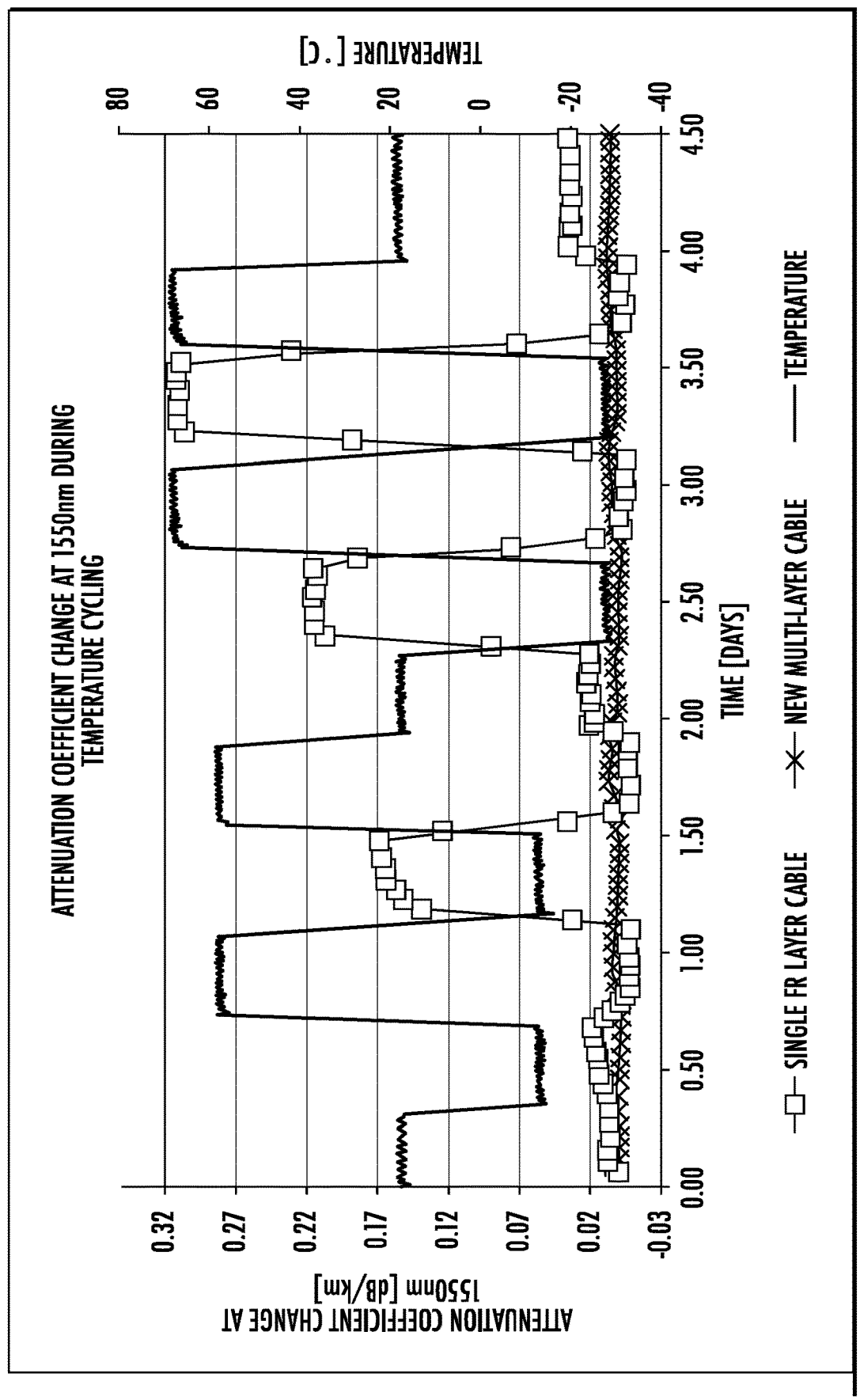
FIG. 5 is a graph of attenuation coefficient changes for various cable compositions during temperature cycling.

FIG. 5 illustrates attenuation readings for various cables subjected to temperature cycling. The optical signal wavelength being tested in this experiment is 1550 nm. Two cables are tested, "New Multi-layer cable" and "Single FR Layer Cable." "New Multi-layer cable" is an embodiment of cable 10 consistent with FIG. 3. "Single FR Layer Cable" is an embodiment of cable 10 based on the embodiment in FIG. 3, except that inner jacket 20 is removed and replaced by a doubling of thickness 32 of outer jacket 22.

Both cables 10 are cycled through temperatures as indicated in FIG. 5. The cables 10 are initially subjected to a first temperature at 20 degrees Celsius for six hours. As indicated in FIG. 5, the next several temperature cycles are −15 degrees Celsius for six hours, 60 degrees Celsius for six hours, −15 degrees Celsius for six hours, 60 degrees Celsius for six hours, 20 degrees Celsius for six hours, −30 degrees Celsius for six hours, 70 degrees Celsius for six hours, −30 degrees Celsius for six hours, 70 degrees Celsius for six hours, and finally 20 degrees Celsius for twelve hours. Whereas the signal in the Single FR Layer Cable is increasingly attenuated each successive time that cable 10 is subjected to cold temperatures, the New Multi-layer cable maintains a relatively low attenuation below 0.05 dB/km, and more particularly an attenuation at or below 0.02 dB/km. Thus, Applicant has found that the various double layer outer jacket arrangements discussed herein provide for significantly improved attenuation performance relative to single layered cable jackets.

The coefficient of thermal expansion ("CTE") of a polymer is generally measured using Thermal Mechanical Analysis (TMA). As used herein, the term "coefficient of thermal expansion," or "CTE," refers to the average coefficient of thermal expansion unless otherwise indicated. Additionally, as used herein, the term "average coefficient of thermal expansion," or "average CTE," refers to the average coefficient of linear thermal expansion of a given material or layer between 0° C. and 300° C. The measurement of CTE as given herein is in units of ppm/° C., which is equivalent to 10-6 m/m° C. The CTE can be determined, for example, using the procedure described in ASTM E228 "Standard Test Method for Linear Thermal Expansion of Solid Materials With a Push-Rod Dilatometer" or ISO 7991:1987 "Glass—Determination of coefficient of mean linear thermal expansion."

In various embodiments, outer jacket 22 is formed from a fire resistant (FR) low or zero halogen polymer material, such as an FR polyolefin material. In other embodiments, outer jacket 22 is formed from an FR halogen containing polymer material, and specifically is formed from an FR PVC material. In other embodiments, outer jacket 22 is formed from LSZH (e.g., FR polyethylene), nylon and/or polyester materials.

In various embodiments, the polymer material of outer jacket 22 is a fire resistant material having one or more of the following properties: a polyolefin base resin, metal oxide fire retardant(s), limiting oxygen index (LOI) greater than 40 and/or specific gravity greater than 1.50. In various embodiments, the polymer material of outer jacket 22 is a fire resistant material having one or more of the following properties: a PVC base resin, metal oxide fire retardant(s), LOI greater than 48 and/or a specific gravity greater than 1.55.

In various embodiments, the various polymer materials of outer jacket 22 are formed from an FR polymer material. In particular embodiments, these FR polymer materials are extrudable polymer materials that include one or more material, additive or components embedded in the polymer material that provides fire resistant characteristics such as relatively low heat generation, char layer formation, low flame propagation, low smoke production, etc. In various embodiments, the fire resistant material may include an intumescent material additive embedded in the polymer material and/or a non-intumescent fire resistant material embedded in the polymer material, such as a metal hydroxide, aluminum hydroxide, magnesium hydroxide, etc., that produces water in the presence of heat/fire which slows or limits heat transfer through cable 10 which in turn limits heat generation and flame propagation along cable 10. In certain embodiments, the fire resistant material of outer jacket 22 may be a highly-filled polymer material with a limiting oxygen index (LOI) of 40 or higher. In various embodiments, the fire resistant material of outer jacket 22 may include other additives in addition to the fire resistant materials, such coloring materials or UV/light blocking (e.g., carbon black) materials. In various embodiments inner jacket 20 is made of a material or materials with the characteristics identified in this disclosure.

In an embodiment, communication element 12 includes a fiber optic element, such as optical fibers. The optical fibers discussed herein include optical fibers that are flexible, transparent optical fibers made of glass or plastic. The fibers function as a waveguide to transmit light between the two ends of the optical fiber. Optical fibers include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. In various embodiments, the optical fibers may be bend insensitive optical fibers or multi-core optical fibers.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred as required. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable comprising:
   an optical fiber;
   a tight buffer layer that surrounds the optical fiber;
   a strengthening element that surrounds the tight buffer layer;
   an inner jacket that surrounds the strengthening element, the inner jacket comprising a first material having a first coefficient of thermal expansion and a first Shore D hardness, the first coefficient of thermal expansion being no more than 20 ppm/° C.; and an outer jacket that surrounds the inner jacket, the outer jacket comprising a second material having a second coefficient of thermal expansion and a second Shore D hardness, the second Shore D hardness being at least 40, wherein the first material is different from the second material;

wherein the first coefficient of thermal expansion is less than the second coefficient of thermal expansion and the first Shore D hardness is less than the second Shore D hardness.

2. The cable of claim 1, wherein the strengthening element comprises a layer of a plurality of aramid yarn strands located in a region between an outer surface of the tight buffer layer and an inner surface of the inner jacket, wherein an inner surface of the outer jacket is directly bonded to an outer surface of the inner jacket, and wherein an outer surface of the outer jacket defines the outer-most surface of the cable.

3. The cable of claim 1, wherein the second material comprises a modulus of elasticity of at least 100 mPa.

4. The cable of claim 1, wherein the second material comprises a modulus of elasticity of at least 110 mPa.

5. The cable of claim 1, wherein the first coefficient of thermal expansion of the first material is no more than 15 ppm/° C.

6. The cable of claim 1, wherein the second Shore D hardness of the second material is at least 45.

7. The cable of claim 6, wherein the first coefficient of thermal expansion of the first material is no more than 12 ppm/° C.

8. The cable of claim 7, wherein the second Shore D hardness of the second material is at least 48.

9. The cable of claim 2, wherein the first coefficient of thermal expansion of the first material is no more than 10 ppm/° C.

10. The cable of claim 9, wherein the second Shore D hardness of the second material is at least 50.

11. The cable of claim 1, wherein the inner jacket comprises a first thickness and the outer jacket comprises a second thickness and wherein a ratio of the first thickness to the second thickness is in a range from 0.71:1 to 1.4:1.

12. The cable of claim 11, wherein the ratio of the first thickness to the second thickness is about 1:1.

13. The cable of claim 1, wherein the cable has an attenuation coefficient less than 0.05 dB/km for a wavelength of 1550 nm while the cable is cycled through a plurality of temperature stages, the temperature stages being in a range from −30° C. to 70° C.

14. The cable of claim 1, wherein the inner jacket comprises a first thickness in a range from 0.5 mm to 0.7 mm.

15. The cable of claim 14, wherein the outer jacket comprises a second thickness in a range from 0.5 mm to 0.7 mm.

* * * * *